Patented June 30, 1936

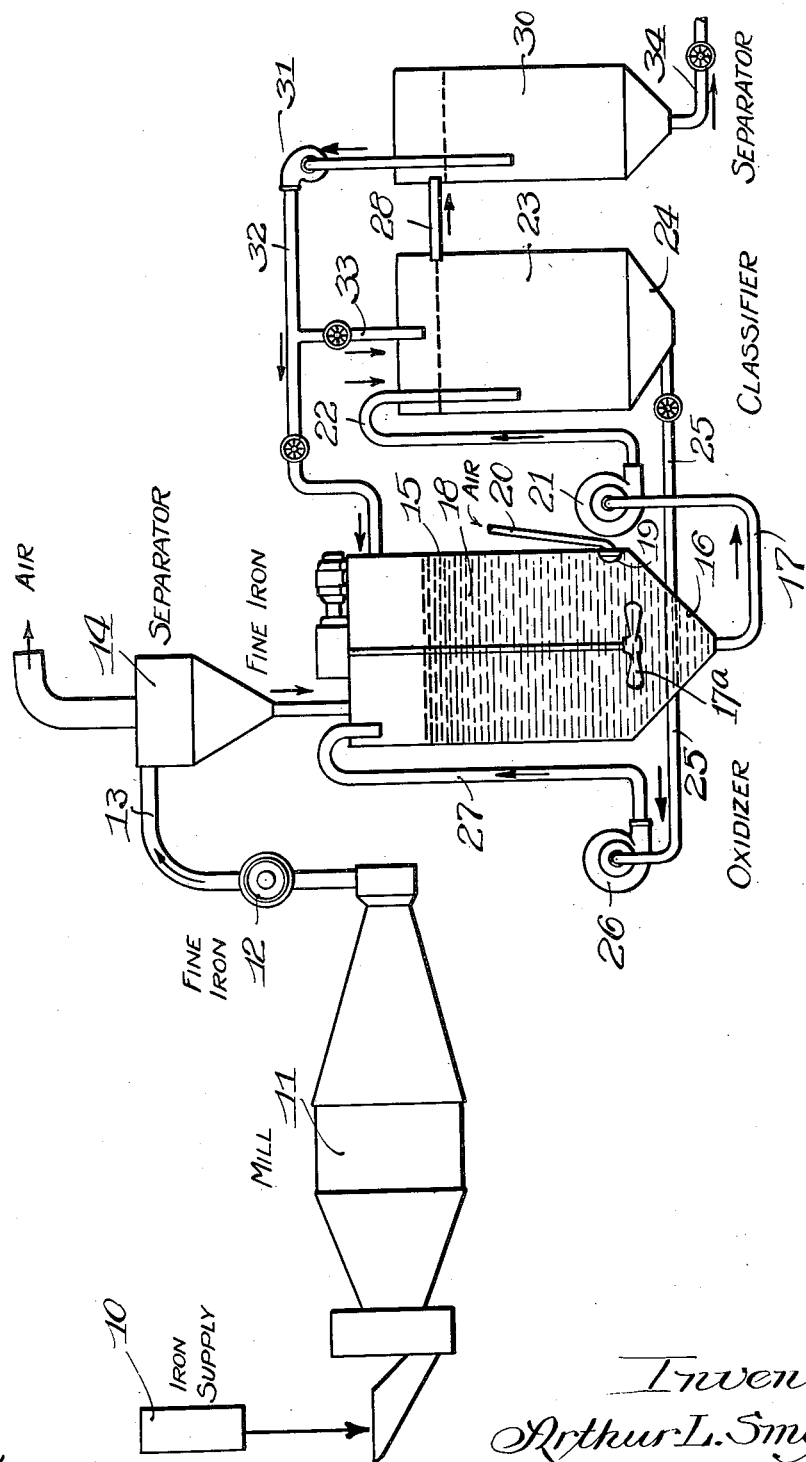

2,045,808

UNITED STATES PATENT OFFICE 2,045,808

MANUFACTURE OF IRON OXIDE

Arthur L. Smyly, Chicago, Ill.

Application November 2, 1933, Serial No. 696,318

13 Claims. (Cl. 252—2.5)

The present invention relates to a method of making iron oxide from iron. It has special reference to the manufacture of a ferric oxide hydrate, and in particular to one which may be used for the treatment of hydrocarbon gases to remove sulphurous impurities.

Heretofore iron oxide has been made by corroding loose or bundled scrap iron in sheet form or in cast form, or from drillings, borings, turnings or filings. It has long been desirable to have a continuous process which is rapid, which can be housed in a small plant with a minimum of equipment, and one which will utilize fine iron dusts, such as ground iron, or the dust from cylinder grinding operations, or from dust collecting systems.

The present invention provides such a process, and in its preferred form of operation prepares an iron oxide which is, however, not a pure product, but which contains material advantageous to its later utilization. I refer to use of ferric oxide hydrate used for removing sulphurous impurities from illuminating gas. In such practice active iron oxide is distributed on a carrier such as wood fiber in the form of shavings or chips, or other carrier which forms a porous bed. Consequently, I will describe the invention with reference to this preferred use of it, and will point out wherein it may be varied or modified for practice to form a product for other uses.

The general object of the invention is the provision of a process for corroding fine iron metal particles to yield a ferric oxide hydrate.

A particular object is the formation of a ferric oxide hydrate capable of absorbing sulphur or sulphurous materials which contaminate gases, and which when so spent is capable of regeneration by action of air thereon, leaving free sulphur and a regenerated residue of ferric oxide hydrate again capable of similar activity and of repeated regeneration.

A particular object of the invention is the oxidation of iron held in suspension in an aqueous vehicle.

A further object of the invention is the use of bubbles of air in water containing iron, to aid in suspending the iron and to provide oxygen for oxidation thereof.

Still another object of the invention is the use of a suspended solid in the water containing the iron particles to aid in suspending the iron particles.

A further object of the invention is the use of a fibrous material in suspension in the water containing the iron particles.

Another object of the invention is the provision of a process and apparatus for effecting the corrosion of the iron particles and the separation and recovery of the resulting iron oxide hydrate, either by a continuous operation or by an intermittent operation or by a batch operation.

Various other and ancillary objects and advantages of the invention will become apparent from the following description and explanation of the preferred mode and apparatus herein described to illustrate the nature of the invention and of several modifications thereof.

In the accompanying drawing the single figure illustrates more or less diagrammatically the apparatus and the process herein described in detail.

The invention consists in suspending iron in water agitated mechanically as by a mechanism or by air, or by both, and providing in the water a large supply of minute air bubbles. These attach themselves to the fine iron and aid in holding the grains in suspension. Oxidation results, and the agitation aids in separating the oxide from the iron to expose new iron surface to oxidation by the oxygen-containing water. Chemical catalytic agents such as salts, sodium chloride, ferric chloride, ferrous sulphate, and the like, may be present, although these are not necessary.

The liquid may be continuously or intermittently drawn from the oxidizing vessel and subjected to classification whereby to separate the heavier settlings of iron from the water containing the lighter suspended oxide. The iron settlings may be continuously or intermittently returned to the oxidizing vessel, and the oxide suspension may be subjected to further treatment, such as settling, to separate the oxide precipitate from the water. The separation need not be complete, and the water portion may be carried back to the oxidizer.

I have discovered that the fineness of the iron determines the success of the process from a practical engineering standpoint. Where the iron is very fine, say from 150 mesh or over, the process is possible as described above, using only the fine iron, air and water, without other solid substance. However, as the iron is coarser, there is difficulty in keeping it suspended. But in addition I have found that coarser iron may be used when the effective density of the liquid is increased. The density may be increased in numerous ways, and preferably by adding solid means also suspensible in the water. By this expedient a fine iron grain may either attach itself to another solid, which acts as a float, or the other solids act as a retardant or bumper to lessen the tendency of the iron to settle out. As such solid means I prefer fine sawdust, wood flour, paper pulp or like fibrous or solid material. With such agents I may use iron from 100 to 150 mesh.

In carrying out the process as above described with fibrous carrier, all or part of the fiber may be retained with the iron oxide product. But where such product is later mixed with chips or shavings for use in purifying gas, the fiber from the corrosion process is not harmful, and is advantageous in serving as a body on which the oxide is distributed.

In practical operation the invention may be carried out by feeding iron from a supply 10 to a grinder 11. From the grinder a fan 12 carries ground iron as dust through a conduit 13 into an air separator 14. In the exemplary equipment the apparatus is shown connected for continuous operation, so the air-separator 14 may feed a supply of ground iron, or dust, continuously or intermittently into an oxidizing vessel 15.

The exemplary oxidizing vessel 15 comprises a deep vat having a cone bottom 16 and a bottom drain 17. An agitator 17ᵃ is illustrated to keep up a circulation. Air is introduced into the water 18 in the vat, through suitable means such as the finely perforated nozzle 19. An air supply pipe 20 feeds either cold or heated air, under pressure, into the vat in fine bubble formation.

As oxidation proceeds a part of the contents may be withdrawn, continuously or intermittently, through the drain 17 which contains suitable pump means 21, and is discharged by pipe line 22 into a classifier 23. In the exemplary classifier 23 the heavy iron settles out first and collects in a cone bottom 24 of the classifier tank. Pipe 25 leads from the cone bottom 24 to a pump 26 which discharges iron and sludge through pipe 27, back into the oxidizing tank 15. Pumps 21 and 26 are constructed effectively to withstand the abrasion of the iron grains passing through them. The attrition in the pumps and pipes also aids in removing iron oxide from iron grains.

From the tank 23 an overflow pipe 28 collects liquid carrying iron oxide in suspension for separation of water and solid. Settling or filtration may be practiced. Where settling is employed as in the tank 30, the top liquid, even though it contain oxide in suspension may be returned by pump 31 through pipe 32, either to the classifier 23 by pipe 33, or to the oxidizer 18, or to both. Where chemical salts are present this recirculation is advisable to preserve the salt. Settling tank 30 is provided with a drain 34 from which concentrated sludge oxide is withdrawn. This may be filtered and rendered more concentrated.

The process may be operated as a batch process in an obvious manner and changes in the equipment may be made. In fact the classifying vat may be omitted, and by stopping the air, and the agitation in the oxidizer, the oxidizer may be used as a classifier from which the liquid containing oxide in suspension may be drawn.

In operating the process as above described sawdust or fiber may be employed in amount of 1 to 2%, or less of fiber on the base of water employed. This forms a somewhat dense liquid to retard settling of the iron during agitation. However, when there is no agitation, iron grains attached to a fiber drag the fiber to the bottom and remove the danger that fiber carrying iron will run over into the separating system 30. The oxide also may weight the fiber, but the oxide on fiber is more inclined to float than the oxide alone, and the presence of fiber is therefore advantageous in recovering the oxide.

Where the oxide obtained is to be used for pigments and like uses, the fiber is preferably omitted, and the original iron dust is made sufficiently fine, for example not under 150 mesh. But where the oxide can be used with fiber or other carrier, use of carrier is preferred in order to lessen the expense of the finer grinding, and to facilitate the corrosion and the separation of the oxide.

The wet iron oxide may be a mixture of hydrates of blue green ferro-ferric oxide and of ferric oxide. The former is readily subject to oxidation to form the latter. The product, either before or after complete oxidation, may be washed by filtration or decantation and concentrated as a wet sludge, or dried and ground, as preferred. For use in purification of gases containing sulphurous compounds, the oxide is not dried at high heat, such as above 212° F. in order to preserve its active hydrated form. It may be mixed with alkali, such as lime, and additional carrier, such as wood chips or shavings for use in beds in absorbing chambers.

In explanation of the chemistry of the process it is stated that the iron initially forms a ferro-ferric oxide while iron as such is present. Two forms of this lower oxide may be produced. The black form known as the magnetic form is a stable form which is quite resistant to complete oxidation, and it is likely to form in the absence of sufficient oxygen dissolved in the water. For a gas purification product the magnetic form is not desired, as it is not efficient, and is not active or subject to revivification. The other type is a blue green ferro-ferric oxide which is not stable, and which is subject to being readily oxidized by air or other chemical agents, especially when alkaline. For example, to distinguish one form from the other, an application of hydrogen peroxide may be made. The unstable form readily goes over to ferric oxide, indicated by change of color to a yellow brown. For a gas purification product the unstable ferro-ferric oxide is the first form desired, so that it may be an intermediate product in the production of the ferric oxide hydrate. Hence in corroding the iron grains, it is necessary to control the corrosion by assuring sufficient oxygen in the oxidizer to direct the formation of the unstable ferro-ferric oxide. Such condition of oxygen supply will also oxidize some of the intermediate form to the ferric oxide form. The mixture may therefore assume a variety of colors depending on conditions, but eventually it can be oxidized to the ferric oxide form.

In addition to air in the oxidizer, I may introduce other gases, especially acidic ones, such as sulphur dioxide or carbon dioxide in order to create an acid condition favoring the corrosion. Other changes include wet grinding of the iron and putting into the wet mill, or into a dry mill, shavings, chips and the like to reduce the same to fibrous form simultaneously with grinding the iron. Where the wet grinding is employed addition of cellulose fiber to the mill may form some gelatinous cellulose hydrate, which aids in making the liquid dense for the purposes of this invention.

Various other changes and modifications of the process are contemplated as falling within the scope of the invention defined in the appended claims.

I claim:

1. The process of forming iron oxide which comprises grinding iron to a fine granular form, agitating said grains immersed in water whereby to effect suspension thereof, introducing oxygen into said water whereby to maintain dissolved oxygen in the water with the resulting formation of an unstable oxidizable ferro-ferric hydroxide directly from the iron, removing a part of the mixture, separately concentrating the iron grains and the oxide in the liquid portion of said mixture, returning the iron concentrate to the original mixture, and separating the iron oxide from the liquid of the remaining concentrate.

2. The process of forming iron oxide which comprises grinding iron to a fine granular form, agitating said grains immersed in water whereby to effect suspension thereof, introducing oxygen into said water whereby to maintain dissolved oxygen in the water with the resulting formation of an unstable oxidizable ferro-ferric hydroxide directly from the iron, removing a part of the mixture, separately concentrating the iron grains and the oxide in the liquid portion of said mixture, returning the iron concentrate to the original mixture, separating the iron oxide from the liquid of the remaining concentrate, and subjecting the iron oxide product to oxidation to insure formation of ferric oxide.

3. The process of forming iron oxide which comprises grinding iron to a fine granular form, agitating said grains immersed in water whereby to effect suspension thereof, introducing oxygen into said water whereby to maintain dissolved oxygen in the water with the resulting formation of an unstable oxidizable ferro-ferric hydroxide directly from the iron, removing a part of the mixture, permitting iron grains to settle from the removed portion, returning the settled iron to the original mixture, and separating the iron oxide from the remaining portion from which the iron settled.

4. The process of continuously corroding iron to iron oxide which comprises agitating a mixture comprising fine iron grains, water, and oxygen in a containing vessel, continuously moving a portion of the mass into a classifier, concentrating the fine iron to form a heavy sludge in said classifier, returning the sludge to the first containing vessel, removing the liquid containing suspended iron oxide from the classifier to a separator, separating iron oxide from the material so removed, and returning the residual liquid to the liquid containing the fine iron.

5. The method of corroding iron to form an iron oxide which comprises agitating iron grains passing a 150 mesh screen in water in the presence of gaseous oxygen, the agitation being sufficiently vigorous in the presence of the resulting bubbles of gas to keep said fine iron particles in suspension.

6. The method of corroding iron to form an iron oxide which comprises agitating iron grains passing a 100 mesh screen in water containing a densifying agent in the presence of gaseous oxygen, the agitation being sufficiently vigorous in the presence of the resulting bubbles of gas to keep said fine iron particles in suspension.

7. The method of corroding iron to form an iron oxide which comprises agitating iron grains passing a 100 mesh screen in water containing suspended fiber in the presence of gaseous oxygen.

8. The method of corroding iron to form an iron oxide which comprises agitating iron grains passing a 150 mesh screen in water in the presence of gaseous oxygen and a chemical promoting agent, the agitation being sufficiently vigorous in the presence of the resulting bubbles of gas to keep said fine iron particles in suspension.

9. The method of corroding iron to form an iron oxide which comprises agitating iron grains passing a 100 mesh screen in water containing suspended fiber in the presence of gaseous oxygen and a chemical promoting agent.

10. The process of converting iron substantially all to ferric oxide which comprises grinding the iron to fine powder, suspending and agitating the iron powder in water in the presence of oxygen dissolved in the water until all the iron while suspended has been corroded substantially all to a mixture of ferric oxide and unstable blue green ferro-ferric hydrate, and completing oxidation of said unstable oxide to ferric oxide.

11. The process of converting iron into an active ferric oxide hydrate for the purification of sulphur-containing hydrocarbon gases, which comprises grinding the iron to fine powder, suspending and agitating the iron powder in water in the presence of oxygen dissolved in the water until all the iron while suspended has been corroded substantially all to a mixture of ferric oxide and unstable blue green ferro-ferric hydrate, and completing oxidation of said unstable oxide to ferric oxide hydrate.

12. The process of converting iron into an active ferric oxide hydrate for the purification of sulphur-containing hydrocarbon gases, which comprises grinding the iron to a fine powder capable of passing a 100 mesh screen, suspending and agitating said iron powder in water containing suspended fiber in the presence of oxygen dissolved in the water until all the iron has been corroded substantially all to a mixture of ferric oxide hydrate and unstable blue green ferro-ferric oxide hydrate, separating the resulting oxide material and fiber, and maintaining the product in the presence of oxygen in hydrated form without dehydration beyond that effected by heating over 212° F.

13. The process of converting iron into an active ferric oxide hydrate for the purification of sulphur-containing hydrocarbon gases, which comprises grinding the iron to a fine powder capable of passing a 150 mesh screen, suspending and agitating said iron powder in water in the presence of oxygen dissolved in the water until all the iron has been corroded substantially all to a mixture of ferric oxide hydrate and unstable blue green ferro-ferric oxide hydrate, separating the resulting oxide material, and maintaining the product in the presence of oxygen in hydrated form without dehydration beyond that effected by heating over 212° F.

ARTHUR L. SMYLY.